(12) United States Patent
Hyodo et al.

(10) Patent No.: US 8,872,902 B2
(45) Date of Patent: Oct. 28, 2014

(54) STEREOSCOPIC VIDEO PROCESSING DEVICE AND METHOD FOR MODIFYING A PARALLAX VALUE, AND PROGRAM

(75) Inventors: Katsuya Hyodo, Kanagawa (JP);
Hiroyuki Nakamura, Tokyo (JP);
Shuichi Konami, Chiba (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 13/016,423

(22) Filed: Jan. 28, 2011

(65) Prior Publication Data

US 2011/0205343 A1 Aug. 25, 2011

(30) Foreign Application Priority Data

Feb. 22, 2010 (JP) ................. 2010-036372

(51) Int. Cl.
*H04N 13/00* (2006.01)
*H04N 13/02* (2006.01)
(52) U.S. Cl.
CPC ......... *H04N 13/007* (2013.01); *H04N 13/0022* (2013.01); *H04N 13/004* (2013.01); *H04N 13/026* (2013.01)
USPC .......................................................... 348/54
(58) Field of Classification Search
CPC .................................................... H04N 13/00
USPC ......................................... 348/241; 386/357
See application file for complete search history.

(56) References Cited

U.S. PATENT DOCUMENTS

2008/0151079 A1* 6/2008 Iijima et al. ................. 348/241
2011/0013890 A1* 1/2011 Sasaki et al. ................. 386/357

FOREIGN PATENT DOCUMENTS

JP 2001-320734 11/2001
JP 2001-320734 * 12/2001 ............ H04N 13/00

OTHER PUBLICATIONS

U.S. Appl. No. 13/576,166, filed Jul. 31, 2012, Hyodo.
Shinsuke Kishi, et al, An Ergonomic Evaluation system for Stereoscopic 3-D Images, vol. 60, No. 6, pp. 934-942 (2006) (w/ English Abstract).
Shinsuke Kishi, et al., "An ergonomic evaluation system for stereoscopic 3-D image", The Institute of Image Information and Television Engineers, vol. 60, No. 6, 2006, 19 Pages (submitting English translation only, reference previously filed Apr. 14, 2014).

* cited by examiner

*Primary Examiner* — Tung Vo
*Assistant Examiner* — Joseph Becker
(74) *Attorney, Agent, or Firm* — Oblon, Spivak, McClelland, Maier & Neustadt, L.L.P.

(57) ABSTRACT

A stereoscopic video processing device includes a candidate coordinate range calculation unit configured to calculate a range of candidate coordinates of a display position of a reference point of a two-dimensional object in a screen, a parallax total value calculation unit configured to calculate a total value of parallax values of pixels of a region overlapping the two-dimensional object in the stereoscopic video, for each candidate coordinate, a display position determination unit configured to determine a candidate coordinate having a smallest total value of the parallax values as the display position of the reference point of the two-dimensional object, a maximum value specifying unit configured to specify a maximum value of the parallax values of the pixels of the region overlapping the two-dimensional object in the stereoscopic video, and a parallax setting unit configured to set the parallax of the two-dimensional object displayed in the stereoscopic video.

8 Claims, 9 Drawing Sheets

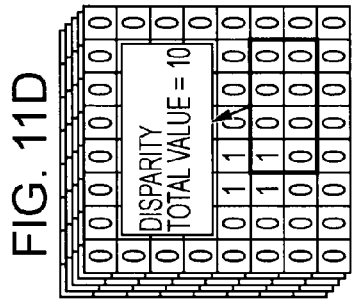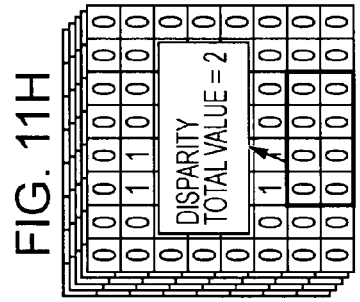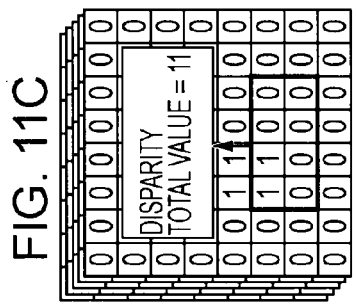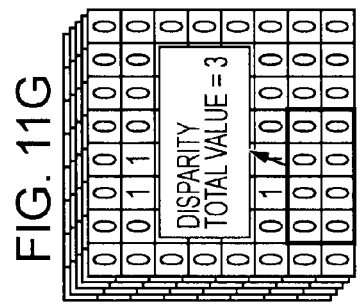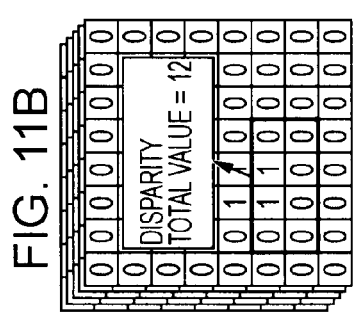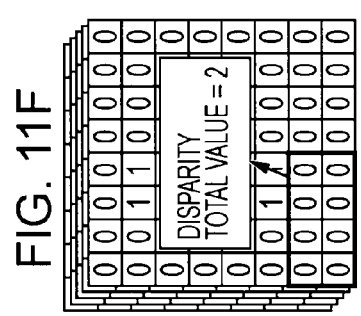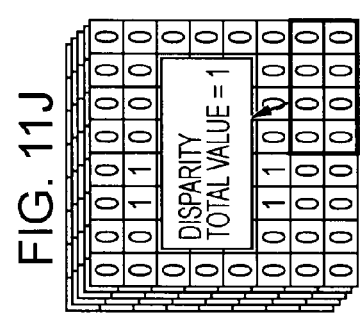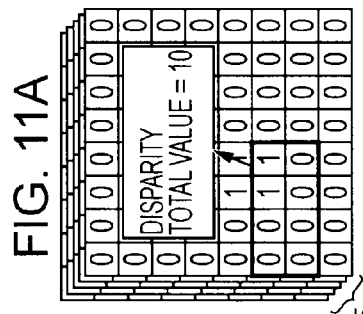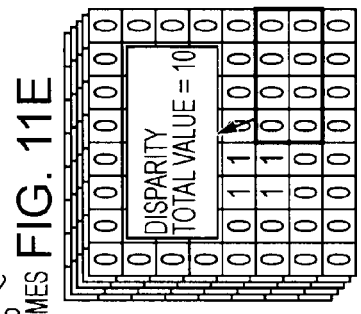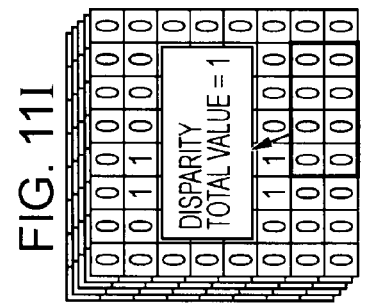

FIG. 12

GUI

| 0 | 0 | 0 | 0 | 0 | 0 | 0 | 0 |
|---|---|---|---|---|---|---|---|
| 0 | 0 | 1 | 1 | 0 | 0 | 0 | 0 |
| 0 | 0 | 1 | 1 | 0 | 0 | 0 | 0 |
| 0 | 0 | 1 | 1 | 0 | 0 | 0 | 0 |
| 0 | 0 | 1 | 1 | 0 | 0 | 0 | 0 |
| 0 | 0 | 1 | 1 | 0 | 0 | 0 | 0 |
| 0 | 0 | 0 | 1 | 1 | 1 | 1 | 0 |
| 0 | 0 | 0 | 1 | 1 | 1 | 1 | 0 |

RIGHT-EYE PLANE

| 0 | 0 | 0 | 0 | 0 | 0 | 0 | 0 |
|---|---|---|---|---|---|---|---|
| 0 | 0 | 0 | 0 | 1 | 1 | 0 | 0 |
| 0 | 0 | 0 | 0 | 1 | 1 | 0 | 0 |
| 0 | 0 | 0 | 0 | 1 | 1 | 0 | 0 |
| 0 | 0 | 0 | 0 | 1 | 1 | 0 | 0 |
| 0 | 0 | 0 | 0 | 1 | 1 | 0 | 0 |
| 0 | 0 | 0 | 0 | 1 | 1 | 1 | 1 |
| 0 | 0 | 0 | 0 | 1 | 1 | 1 | 1 |

LEFT-EYE PLANE

STEREOSCOPIC VIDEO PROCESSING DEVICE AND METHOD FOR MODIFYING A PARALLAX VALUE, AND PROGRAM

BACKGROUND OF THE INVENTION

1. Field of the Invention

The present invention relates to a stereoscopic video processing device and method and a program and, more particularly, to a stereoscopic video processing device and method for constantly displaying a stereoscopic video which is natural and readily viewable, and a program.

2. Description of the Related Art

A person stereoscopically recognizes an object using the discrepancy (parallax) between an image captured by the right eye and the left eye. Eyeball rotation changes the convergence angle and a person recognizes the convergence angle as the distance to the object. The convergence angle is the intersection angle of sight lines.

Using the characteristics of the human eyes, if two two-dimensional images with parallax for the left and right eyes are prepared and are respectively projected to the left and right eyes, a person has the illusion of a distance from the convergence angle to the object and experiences a stereoscopic effect. Parallax is the deviation between the left-eye image and the right-eye image.

Display of the left-eye image and the right-eye image one by one is referred to as a stereoscopic image and the consecutive change between a plurality of left-eye and right-eye images is referred to as a stereoscopic video. A device for displaying these images is referred to as a stereoscopic video display device.

A stereoscopic video display device for alternately displaying a right-eye image and a left-eye image on a display with parallax using shutter glasses in which a pair of left and right lens units is alternately switched between a projective state and light shielding state and controlling the left and right lens units to be alternately switched in the projective state and the light shielding state in the timing of the switching between the right-eye image and the left-eye image such that the switching operation of the shutter glasses is unnecessary has been proposed (for example, see Japanese Unexamined Patent Application Publication No. 2001-320734).

In a stereoscopic video display device, a two-dimensional object such as GUI or text may be displayed so as to overlap a stereoscopic video. In this case, two methods may be largely used. One method is a method of overlapping the two-dimensional object fixed on the stereoscopic video (Method A). Method A is mainly used in games or the like.

The other method is a method of divisionally displaying the display regions of the stereoscopic video and the two-dimensional object (Method B). Method B is mainly used in subtitles of movies.

SUMMARY OF THE INVENTION

However, in Method A, a protruded portion which is regarded as a most important element in the stereoscopic video may be blocked. In addition, since a convergence angle for viewing the second-dimensional object and a convergence angle for viewing the stereoscopic object are different, when viewing the two-dimensional object of the stereoscopic video, adjustment of the convergence angle is forced such as to cause eyestrain to a viewer.

In Method B, it is necessary to secure an area for the two-dimensional object in a screen. To this end, the stereoscopic video may not be efficiently used over the entire screen. In addition, similar to Method A, since the convergence angles for viewing the two-dimensional object and the stereoscopic object are different, eyestrain may be caused.

It is desirable to constantly display a stereoscopic video which is natural and readily viewable.

According to an embodiment of the present invention, there is provided a stereoscopic video processing device including: a candidate coordinate range calculation means configured to calculate a range of candidate coordinates of a display position of a reference point of a two-dimensional object in a screen based on a movable region which is a predetermined region for displaying the two-dimensional object on the screen of a stereoscopic video and a size of the two-dimensional object; a parallax total value calculation means configured to calculate a total value of parallax values of pixels of a region overlapping the two-dimensional object in the stereoscopic video, for each candidate coordinate, if the two-dimensional object is displayed using each of the candidate coordinates in the range as a reference point; a display position determination means configured to determine a candidate coordinate having a smallest total value of the parallax values as the display position of the reference point of the two-dimensional object; a maximum value specifying means configured to specify a maximum value of the parallax values of the pixels of the region overlapping the two-dimensional object in the stereoscopic video, if the two-dimensional object is displayed using the determined display position as the reference point; and a parallax setting means configured to set parallax of the two-dimensional object displayed in the stereoscopic video based on the specified maximum value of the parallax value.

The stereoscopic video signal may have a frame rate per means time, and the parallax total value calculation means may calculate the total value of the parallax values specified based on a parallax plane representing parallax of each pixel as information included in a frame of the stereoscopic video signal.

The display position determination means may calculate the total value of the parallax values of the pixels of the region overlapping the two-dimensional object for each candidate coordinate in a plurality of frames for displaying the two-dimensional objects.

The maximum value specifying means may specify the maximum value of the parallax values of the pixels of the region overlapping the two-dimensional object in the stereoscopic video, if the two-dimensional object is displayed using the determined display position based on the parallax plane of the plurality of frames for displaying the two-dimensional object as the reference point.

According to another embodiment of the present invention, there is provided a stereoscopic video processing method including the steps of: causing a candidate coordinate range calculation means, to calculate a range of candidate coordinates of a display position of a reference point of a two-dimensional object in a screen based on a movable region which is a predetermined region for displaying the two-dimensional object on the screen of a stereoscopic video and a size of the two-dimensional object; causing a parallax total value calculation means to calculate a total value of parallax values of pixels of a region overlapping the two-dimensional object in the stereoscopic video, for each candidate coordinate, if the two-dimensional object is displayed using each of the candidate coordinates in the range as a reference point; causing a display position determination means to determine a candidate coordinate having a smallest total value of the parallax values as the display position of the reference point of the two-dimensional object; causing a maximum value specifying means to specify a maximum value of the parallax values of the pixels of the region overlapping the two-dimensional object in the stereoscopic video, if the two-dimensional object is displayed using the determined display position as a reference point; and causing a parallax setting means to set parallax of the two-dimensional object displayed in the stereoscopic video based on the specified maximum value of the parallax value.

According to another embodiment of the present invention, there is provided a program for enabling a computer to function as a stereoscopic video processing device including: a candidate coordinate range calculation means configured to calculate a range of candidate coordinates of a display position of a reference point of a two-dimensional object in a screen based on a movable region which is a predetermined region for displaying the two-dimensional object on the screen of a stereoscopic video and a size of the two-dimensional object; a parallax total value calculation means configured to calculate a total value of parallax values of pixels of a region overlapping the two-dimensional object in the stereoscopic video, for each candidate coordinate, if the two-dimensional object is displayed using each of the candidate coordinates in the range as a reference point; a display position determination means configured to determine a candidate coordinate having a smallest total value of the parallax values as the display position of the reference point of the two-dimensional object; a maximum value specifying means configured to specify a maximum value of the parallax values of the pixels of the region overlapping the two-dimensional object in the stereoscopic video, if the two-dimensional object is displayed using the determined display position as the reference point; and a parallax setting means configured to set the parallax of the two-dimensional object displayed in the stereoscopic video based on the specified maximum value of the parallax value.

According to another embodiment of the present invention, a range of candidate coordinates of a display position of a reference point of a two-dimensional object in a screen is calculated based on a movable region which is a predetermined region for displaying the two-dimensional object on the screen of a stereoscopic video and a size of the two-dimensional object; a total value of parallax values of pixels of a region overlapping the two-dimensional object in the stereoscopic video is calculated for each candidate coordinate, if the two-dimensional object is displayed using each of the candidate coordinates in the range as a reference point; a candidate coordinate having a smallest total value of the parallax values is determined as the display position of the reference point of the two-dimensional object; a maximum value of the parallax values of the pixels of the region overlapping the two-dimensional object in the stereoscopic video is specified if the two-dimensional object is displayed using the determined display position as the reference point; and the parallax of the two-dimensional object displayed in the stereoscopic video is set based on the specified maximum value of the parallax value.

According to the present invention, it is possible to constantly display a stereoscopic video which is natural and readily viewable.

BRIEF DESCRIPTION OF THE DRAWINGS

FIGS. 11A to 11J are diagrams showing a parallax total value of a region overlapping a GUI of 5 frames obtained at an interval of 1 second;

FIG. 12 is a diagram showing a right-eye plane and a left-eye plane generated by a parallax adjustment unit of FIG. 8;

DESCRIPTION OF THE PREFERRED EMBODIMENTS

Hereinafter, embodiments of the present invention will be described with reference to the accompanying drawings.

First, a stereoscopic video display will be described.

Figure 1:
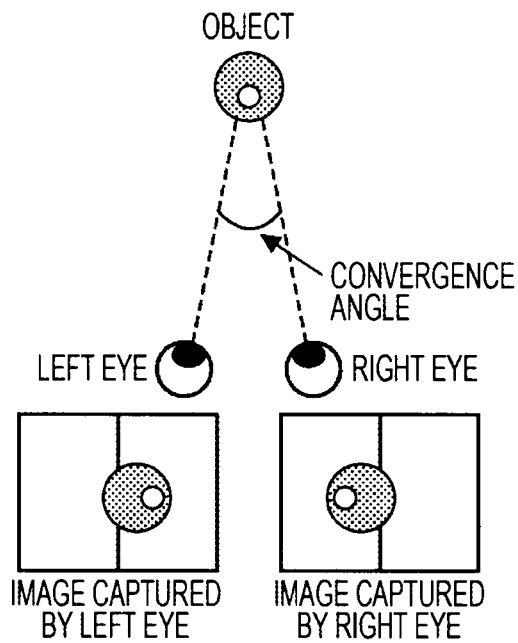
FIG. 1 is a diagram illustrating a structure in which human eyes recognize a stereoscopic video.

FIG. 1 is a diagram illustrating a structure in which human eyes recognize a stereoscopic video.

As shown in the figure, a person stereoscopically recognizes an object using a discrepancy (parallax) between an image captured by a right eye and an image captured by a left eye. In the example of FIG. 1, in the image captured by the right eye and the image captured by the left eye, the same circular object is displayed, but the display positions are different.

In order to focus human sight lines on a target object, eyeballs of the right eye and the left eye rotate. The rotation of the eyeballs changes a convergence angle and a person recognizes a distance to the object by the convergence angle so as to recognize a stereoscopic video as a result. The convergence angle is an intersection angle of sight lines.

Accordingly, for example, if a stereoscopic video is displayed on a two-dimensional display unit, a right-eye image and a left-eye image with parallax may be prepared and displayed. For example, as shown in FIG. 2, if the right-eye image and the left-eye image with parallax are simultaneously displayed on the two-dimensional display unit, a triangular object of the figure may be displayed stereoscopically (for example, to be protruded from the display unit) by the parallax.

In addition, the right-eye image and the left-eye image are, for example, overlapped and displayed by red light and blue light and are separated by glasses with red and blue color filters so as to be observed by the human right eye and left eye, respectively.

Figure 2:
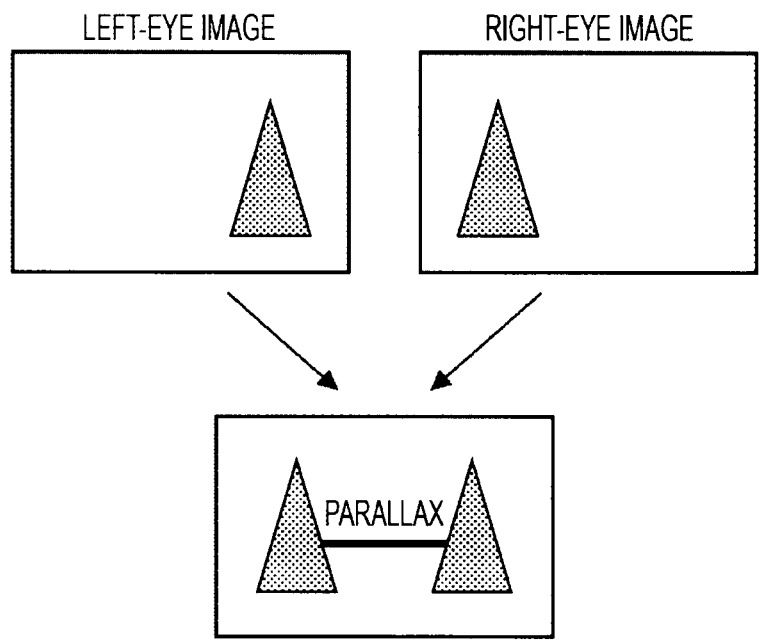
FIG. 2 is a diagram showing an example of a right-eye image and a left-eye image with parallax.
Figure 3:
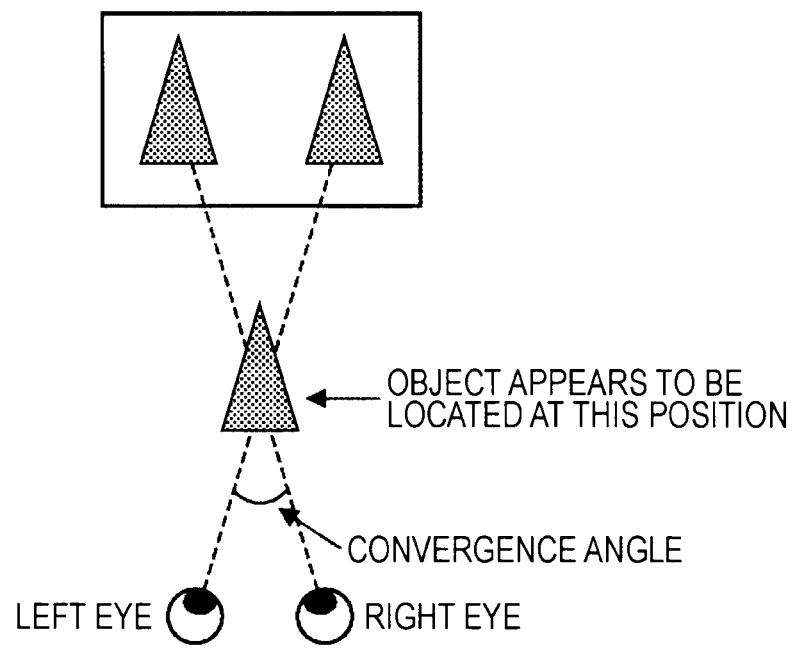
FIG. 3 is a diagram showing an example in which the stereoscopic video shown in FIG. 2 is observed by a person.

FIG. 3 is a diagram showing an example in which the stereoscopic video shown in FIG. 2 is observed by a person. As shown in the figure, the sight line of the eye line may be focused on substantially the center of the object of the left-eye image and the sight line of the right eye may be focused on substantially the center of the object of the right-eye image. Then, the object appears to be protruded at a position where the sight line of the left eye and the sight line of the right eye denoted by dotted lines of the figure are intersected.

However, a two-dimensional object such as GUI or text may be displayed so as to overlap the stereoscopic video. For example, GUI may be displayed on content such as a game or subtitles of movie may be displayed.

In the case where two-dimensional object may be displayed so as to overlap a stereoscopic video, two methods may be largely used. One method is a method of overlapping the two-dimensional object fixed to the stereoscopic video (Method A). Method A is mainly used in games or the like.

Figure 4:
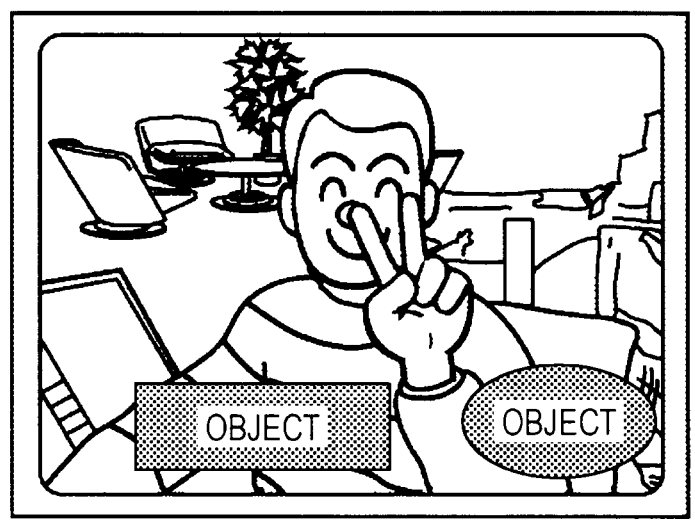
FIG. 4 is a diagram showing an example of an image in which a two-dimensional object is displayed so as to overlap a stereoscopic video using the related art.

FIG. 4 is a diagram showing an example of an image in which a two-dimensional object is displayed so as to overlap a stereoscopic video using Method A. In the figure, an object surrounded by a rectangle and an object surrounded by an ellipse are considered as two-dimensional objects.

In Method A, as shown in FIG. 4, for example, the two-dimensional object is displayed at a certain position in the stereoscopic video, if necessary. However, in Method A, the two-dimensional object may block a protruding part having a highest importance degree in the stereoscopic video. That is, as in the object shown in FIG. 3, a two-dimensional object may overlap a protruding part. To this end, it is difficult to provide a vigorous stereoscopic video.

If the two-dimensional object blocks the protruding part, a user who observes the stereoscopic video has an extremely uncomfortable experience. That is, since the two-dimensional object is an image without parallax, the user experiences the image that appears to be displayed on a screen as per normal (so as not to be protruded). Such a two-dimensional object is displayed so as to hide the part protruding from the screen.

That is, if the two-dimensional object blocks the protruding part, the user sees a part of the protruding part of the stereoscopic video that appears to be depressed and attached to the screen and the two-dimensional object that appears to be displayed in that part.

In Method A, the above-described programs are present.

The other method of the case where the two-dimensional object is displayed so as to overlap the stereoscopic video is a method of divisionally displaying the display regions of the stereoscopic video and the two-dimensional object (Method B). Method B is mainly used in subtitles of movies.

Figure 5:
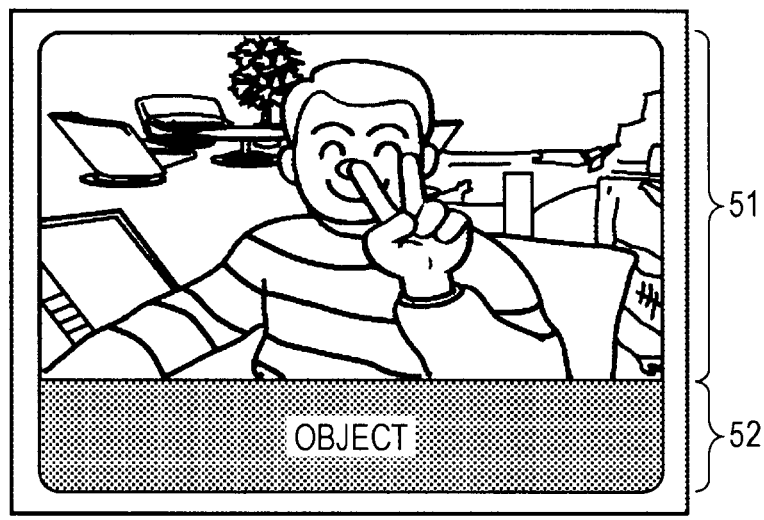
FIG. 5 is a diagram showing another example of an image in which a two-dimensional object is displayed so as to overlap a stereoscopic video using the related art.

FIG. 5 is a diagram showing another example of an image in which a two-dimensional object is displayed so as to overlap a stereoscopic video using Method B. In the figure, a top region 51 of the screen is regarded as a region in which the stereoscopic video is displayed and a bottom region 52 of the screen is regarded as a region in which the two-dimensional object is displayed.

However, in Method B, it is necessary to secure an area for the two-dimensional object in the screen. To this end, the stereoscopic video may not be efficiently used in the entire screen.

If the two-dimensional object is displayed so as to overlap the stereoscopic video, the user pays attention to both the protruding part of the stereoscopic video and the two-dimensional object. In this case, the user alternately views the videos with different parallax, for example. However, adjustment of a convergence angle according to a rapid parallax variation causes eyestrain.

Figure 6:
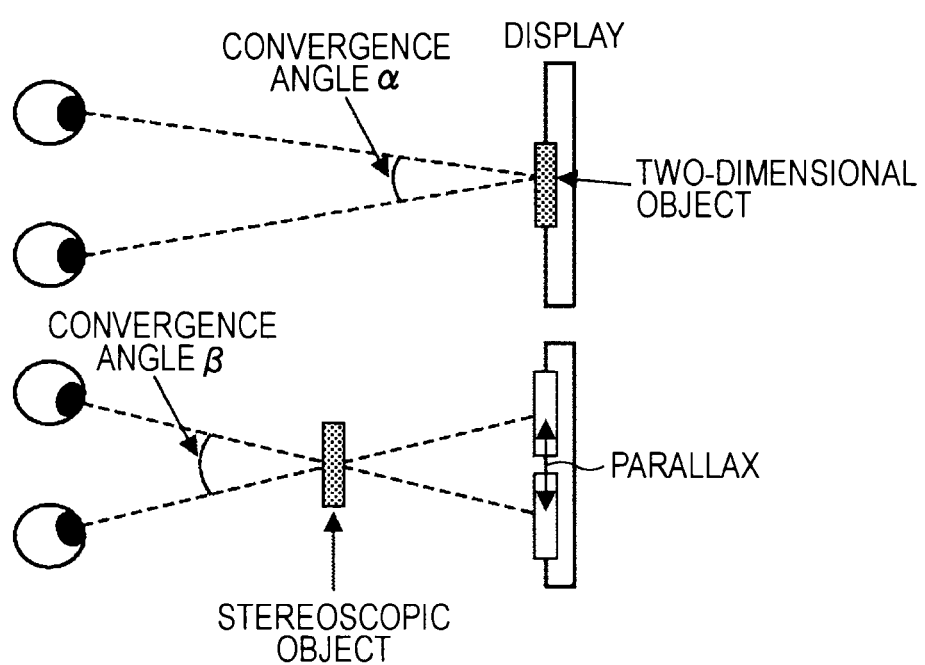
FIG. 6 is a diagram illustrating a variation in convergence angle between sight lines when a stereoscopic video is observed.

For example, as shown in FIG. 6, in a scene in which an object is two-dimensionally displayed, the eyeballs of the human right eye and left eye are directed to a direction in which the convergence angle between sight lines becomes α. Thereupon, if the scene is changed to a scene in which an object is stereoscopically displayed, the eyeballs of the right eye and the left eye rotate such that the convergence angle between the sight lines becomes β. Rapid eyeball rotation causes eyestrain.

A convergence angle variation and eyestrain are disclosed in Kishi Nobusuke et al., Test production of content evaluation system of binocular stereoscopic video, video information media journal, 2006, Vol. 60, No. 6 pp. 934-942 and Hiroshi Harashima et al., Three-dimensional image and human science, Ohmsha, Ltd., 2000.

In both Method A and Method B, it is easy to cause eyestrain as described above.

Figure 7:
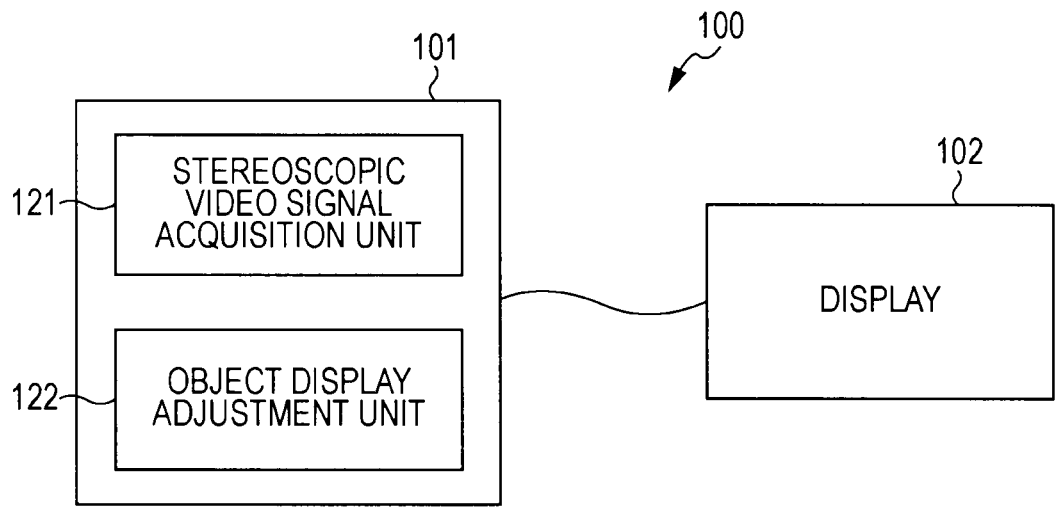
FIG. 7 is a block diagram showing a configuration example of a stereoscopic video display system according to an embodiment of the present invention.

FIG. 7 is a block diagram showing a configuration example of a stereoscopic video display system according to an embodiment of the present invention. In the figure, the stereoscopic video display system 100 includes a stereoscopic video display device 101 and a display 102.

The stereoscopic video display device 101 includes a stereoscopic video signal acquisition unit 121 and an object display adjustment unit 122 therein.

The stereoscopic video signal acquisition unit 121 includes, for example, a tuner for receiving a stereoscopic video signal transmitted as a broadcast wave. The stereoscopic video signal acquisition unit 121 may include, for example, a drive or the like, which reads a stereoscopic video signal recorded on a recording medium such as a DVD or a HDD.

The object display adjustment unit 122 is regarded as a functional block for performing a process of synthesizing a previously prepared two-dimensional object such as GUI or subtitles with the stereoscopic video signal acquired by the stereoscopic video signal acquisition unit 121 and displaying the synthesized signal. The detailed configuration of the object display adjustment unit 122 will be described later with reference to FIG. 8.

The display 102 includes, for example, a Liquid Crystal Display (LCD) and has a two-dimensional image display region. The user wears, for example, glasses or the like with a color filter so as to view a stereoscopic video displayed on the display 102.

The display 102 includes, for example, a screen or the like and may display a stereoscopic video projected from the stereoscopic video display device 101 on a screen. The stereoscopic video display device 101 and the display 102 may integrally configure the stereoscopic video display system 100.

Figure 8:
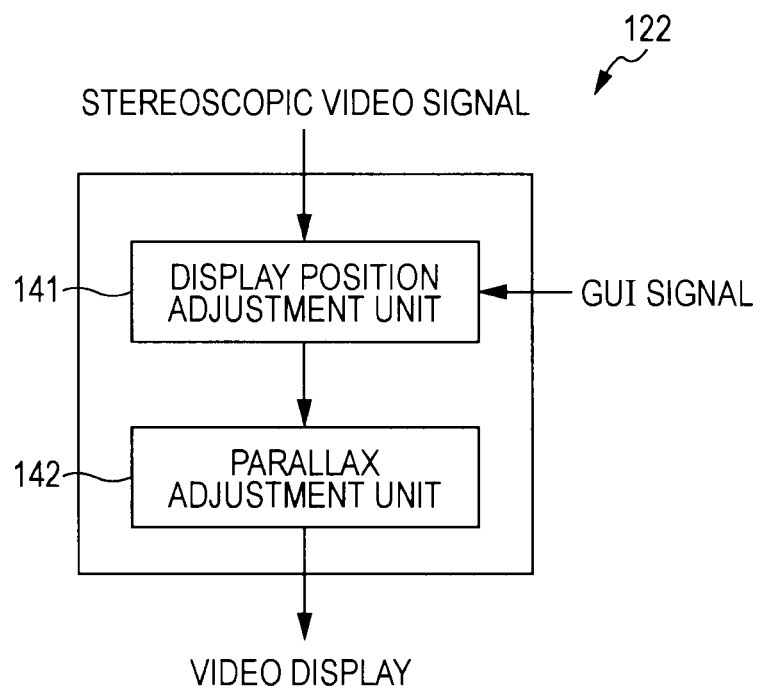
FIG. 8 is a block diagram showing a detailed configuration example of an object display adjustment unit of FIG. 7.

FIG. 8 is a block diagram showing a detailed configuration example of an object display adjustment unit 122 of FIG. 7. In the figure, the object display adjustment unit 122 includes a display position adjustment unit 141 and a parallax adjustment unit 142 therein.

The display position adjustment unit 141 determines the position where a two-dimensional object is displayed, for example, if the two-dimensional object such as GUI is displayed in a stereoscopic video. The display position adjustment unit 141 adjusts and determines the display position of the GUI or the like at a position which does not overlap a protruding part of the stereoscopic video as much as possible.

The display position adjustment unit 141 receives, for example, the supply of a GUI signal and adjusts the display position of the GUI displayed based on the GUI signal.

The parallax adjustment unit 142 applies appropriate parallax to an image such as GUI such that the GUI or the like displayed in the stereoscopic video is protruded along with the protruding part of the stereoscopic video.

This will be described in detail with reference to FIGS. 9 to 12.

Figures 9, 10:
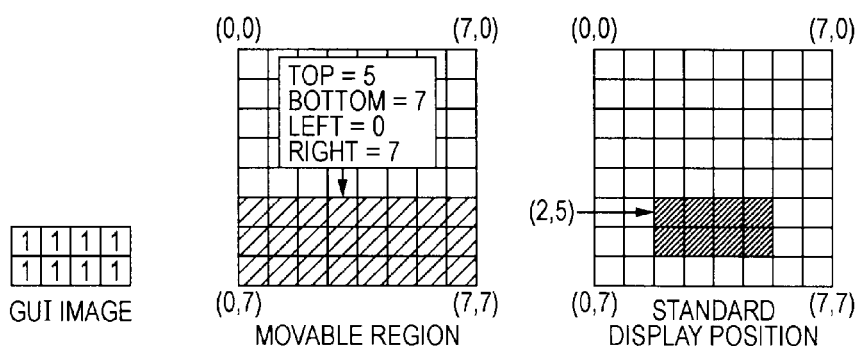
FIG. 9 is a diagram illustrating a configuration of a frame of a stereoscopic video signal.
FIG. 10 is a diagram illustrating information supplied by a GUI signal.

FIG. 9 is a diagram illustrating a configuration of a frame of a stereoscopic video signal. The stereoscopic video signal is configured in frame units. FIG. 9 shows information included in one frame of the stereoscopic video signal. The stereoscopic video signal which is a signal for displaying a moving image includes, for example, 60 frames during 1 second. That is, a stereoscopic video of 1 second may be displayed by the stereoscopic video signal of 60 frames.

In the example of FIG. 9, the frame of the stereoscopic video signal includes a right-eye plane, a left-eye plane and a parallax plane. In addition, information such as a frame header or an error detection bit is appropriately inserted into the frame.

The right-eye plane and the left-eye plane are regarded as image data of one screen displayed on the display 102. In the example of FIG. 9, for simplification of description, an image of one screen displayed on the display 102 includes 64 (=8×8) pixels and each rectangle of the right-eye plane and the left-eye plane denotes one pixel.

In each of the right-eye plane and the left-eye plane, 64 rectangles are present, and "0" or "1" is described in each rectangle. For simplification of description, a rectangle, in which "0" is described, of the figure denotes a black pixel and a rectangle, in which "1" is described, of the figure denotes a white pixel.

In the example of FIG. 9, an image in which a white object having 2×5 pixels is displayed on a black background is shown, and the right-eye plane and the left-eye plane are different in the display positions of the white object having 2×5 pixels. That is, as described with respect to FIG. 3, an image with parallax is displayed such that the object appears to be protruded from the screen.

A discrepancy in the display position between the right-eye plane and the left-eye plane may be specified by the parallax plane. The parallax plane has 64 rectangles corresponding to the pixels of the right-eye plane and the left-eye plane and is information indicating by how many pixels the right-eye plane is deviated from the left-eye plane. In the example of FIG. 9, "2" is described as rectangles of the parts corresponding to the display positions of the white object having 2×5 pixels in the right-eye plane. This indicates that the white object having 2×5 pixels of the right-eye plane is deviated from the left-eye plane to the right by two pixels.

FIG. 10 is a diagram illustrating information supplied by a GUI signal. The GUI signal includes a GUI image to be displayed, a predetermined region (referred to as a movable region) in which the GUI will be displayed in the screen, and information about a standard display position of the GUI. The movable region includes a pixel group having a size equal to or greater than that of the GUI. That is, the GUI may be displayed at a plurality of positions within the movable region (the display position of the GUI may move within the region).

In the example of FIG. 10, for simplification of description, the GUI image is a white rectangular image having 4×2 pixels. A rectangle, in which "0" is described, of the figure denotes a black pixel and a rectangle, in which "1" is described, of the figure denotes a white pixel. The size (4×2 pixels) of the GUI may be specified by the GUI image. The size refers to the number of pixels in a horizontal direction and the number of pixels in a vertical direction.

The movable region is information indicating in which part of the screen including 64 (=8×8) pixels the GUI is displayed. In the example of FIG. 10, the coordinates of the apexes of the screen including 64 pixels are denoted by (0, 0), (7, 0), (0, 7) and (7, 7) as two-dimensional XY coordinates. The rectangles of the pixels corresponding to the movable region are hatched.

On the assumption that the movable region is a rectangle, the coordinate positions of the top, bottom, left and right ends of the movable region are specified by the GUI signal. In the example of FIG. 10, a Y-axis coordinate of the top of the movable region is 5 ("Top=5") and a Y-axis coordinate of the bottom is 7 ("Bottom=7"). In addition, an X-axis coordinate of the left of the movable region is 0 ("Left=0") and an X-axis coordinate of the right is 7 ("Right=7").

The standard display position indicates the default display position of the GUI and is, for example, specified by coordinates indicating the reference point of the GUI image. The left upper end of the rectangular GUI is the reference point. In the example of FIG. 10, the coordinate of the standard display position is (2, 5).

The GUI is displayed based on such a GUI signal.

The display position adjustment unit 141 acquires the movable region and the size of the GUI and the standard display position from the GUI signal and the range of candidate coordinates (x, y) which become the candidates of the display position of the GUI is calculated by Equation (1).

$$\left.\begin{array}{l}R\_left \le x \le R\_right - U\_width + 1 \\ R\_top \le y \le R\_bottom - U\_height + 1\end{array}\right\} \quad (1)$$

In Equation (1), R_top, R_bottom, R_left and R_right denote the top, bottom, left and right of the movable region, respectively. In addition, U_width denotes the number of pixels (4, in the example of FIG. 10) corresponding to the width of the GUI image and U_height denotes the number of pixels (2, in the example of FIG. 10) corresponding to the height of the GUI image.

In the GUI signal of FIG. 10, the range of x obtained by Equation (1) is 0≤x≤4 and the range of y obtained by Equation (1) is 5≤y≤6.

The display position adjustment unit 141 calculates a sum of parallax values of a region overlapping the GUI, if the GUI is displayed at that position with respect to all combinations of candidate coordinates (x, y) in the range of x and y obtained as described above. This is because the GUI is displayed in a part in which parallax is not present as much as possible.

For example, if the GUI of the GUI signal of FIG. 10 is initially displayed in the frame shown in FIG. 9, when the candidate coordinate is (0, 5), the GUI having 4×2 pixels is displayed using the coordinate (0, 5) of the parallax plane as the left top. In this case, since the parallax value (2) of the pixel position of the coordinate (3, 5) of the parallax plane and the parallax value (2) of the pixel position of the coordinate (4, 5) become the parallax values of the region overlapping the GUI, the sum of the parallax values of the region overlapping the GUI is calculated as 4 (=2+2).

Although the pixel position (for example, pixel positions of (0, 5), (0, 6), . . . ) with a parallax value of 0 in the parallax plane is a pixel position without parallax and thus is not calculated as the parallax value of the region overlapping the GUI in the above description, the parallax value of such a pixel position may be calculated as 0.

The display position adjustment unit 141 similarly calculates a sum of parallax values of the region overlapping the GUI of a plurality of frames after the frame in which the GUI is initially displayed. This is because, in general, the GUI is continuously displayed on the screen for at least several seconds. In the above-described example, for example, in 5 frames including a frame of an image displayed after 1 second of the image of the frame shown in FIG. 9, a frame of an image displayed after 2 seconds, . . . , and a frame of an image displayed after 5 seconds, when the candidate coordinate is (0, 5), sums of parallax values of the region overlapping the GUI are respectively calculated.

The display position adjustment unit 141 sums and compares the total values of the calculated sum of the parallax values of the 5 frames for each candidate coordinate. In the above-described example, as the candidate coordinates, a total of 10 combinations of (0, 5), (1, 5), . . . , (4, 5), (0, 6), (1, 6), . . . (4, 6) is present. The display position adjustment unit 141 calculates the total values of the sums of the parallax values of the 5 frames corresponding to the 10 candidate coordinates and determines a candidate coordinate having smallest total value as a GUI display position after adjustment. In addition, the total values of the sums of the parallax values of 5 frames corresponding to the candidate coordinates are referred to as parallax total values.

For example, as shown in FIGS. 11A to 11J, the parallax total value is calculated. FIGS. 11A to 11J show the parallax total values of the region overlapping the GUI of the 5 frames obtained at an interval of 1 second from the frame in which the GUI is initially displayed, if the range of x obtained by Equation (1) is 0≤x≤4 and the range of y is 5≤y≤6. As shown in the figure, in this case, 10 candidate coordinates are present and the regions of the 5 parallax planes corresponding to the candidate coordinates are shown in FIGS. 11A to 11J.

In FIGS. 11I and 11J, the parallax total values are 1.

Similar to the example of FIGS. 11A to 11J, The display position adjustment unit 141 determines a candidate coordinate closest to the standard display position as a GUI display position after adjustment, if a plurality of candidate coordinates having a smallest parallax total value is present. For example, in the GUI signal shown in FIG. 10, since the standard display position is (2, 5), the candidate coordinate (3, 6) corresponding to FIG. 11I becomes a candidate coordinate closest to the standard display position.

If a plurality of candidate coordinates closest to the standard display position is present as the candidate coordinate having a smallest parallax total value, the display position adjustment unit 141 determines, for example, one candidate coordinate randomly selected from the candidate coordinates as a GUI display position after adjustment.

In this way, the display position adjustment unit 141 determines the GUI display position after adjustment.

After the GUI display position after adjustment is determined by the display position adjustment unit 141, the parallax adjustment unit 142 sets the parallax added to the GUI image in the stereoscopic video.

The parallax adjustment unit 142 obtains a maximum value M of a parallax value of a region overlapping the GUI, if the GUI is displayed at the GUI display position after adjustment. For example, if the candidate coordinate is the position shown in FIG. 11I, since the parallax total value is 1, the maximum value M of the parallax value of the region overlapping the GUI becomes 1 when the GUI is displayed at the GUI display position after adjustment.

The parallax adjustment unit 142 synthesizes an image such that the GUI is displayed at the GUI display position after adjustment of the right-eye plane in a frame in which the GUI will be displayed. In addition, in the frame in which the GUI is displayed, the parallax adjustment unit 142 synthesizes an image such that the GUI is displayed at a display position shifted from the GUI display position after adjustment of the left-eye plane to the right side of the screen by M pixels. That is, the right-eye plane and the left-eye plane in which the GUI image with parallax is synthesized are generated by the parallax adjustment unit 142.

The parallax corresponding to M pixels does not have to be added as the parallax of the GUI and, for example, parallax corresponding to the number of pixels obtained by multiplying M by a predetermined coefficient may be added.

Although the example has been described in which the display position adjustment unit 141 and the parallax adjustment unit 142 extract and process 5 frames at intervals of 1 second as shown in FIG. 11 in the above description, the interval or the number of frames is not limited thereto. In addition, the display position adjustment unit 141 and the parallax adjustment unit 142 do not necessarily perform the process of extracting and processing a plurality of frames and, for example, the display position adjustment unit 141 or the parallax adjustment unit 142 may extract and process only one frame.

FIG. 12 is a diagram showing a right-eye plane and a left-eye plane generated by the parallax adjustment unit 142 if the GUI displayed based on the GUI signal of FIG. 10 is displayed using the position shown in FIG. 11I as the GUI display position after adjustment in the frame shown in FIG. 9.

The right-eye plane of FIG. 12 overlaps the image of the right-eye plane of FIG. 9 so as to be synthesized such that a white rectangular GUI image having 4×2 pixels is displayed using the GUI display position (3, 6) after adjustment as a left upper end. The left-eye plane of FIG. 12 overlaps the image of the left-eye plane of FIG. 9 so as to be synthesized such that a white rectangular GUI image having 4×2 pixels is displayed using a position (4, 6) shifted from the GUI display position after adjustment to the right side by 1 pixel as the left upper end.

The right-eye plane and the left-eye plane synthesized as described with reference to FIG. 12 are generated with respect to each of the frames for displaying the GUI. For example, if the GUI is displayed for 10 seconds, synthesis is performed such that a GUI image with parallax is overlapped and displayed on the right-eye plane and the left-eye plane corresponding to 600 (=10×60) frames.

In this way, the image based on the right-eye plane and the left-eye plane generated by the parallax adjustment unit 142 is output to the display 102.

Thus, the user who observes the display 102 sees the GUI which appears to be displayed at a position which does not overlap the protruding part of the stereoscopic video as much as possible. The GUI does not appear to be fixed to the screen, but appears to protrude from the screen, along with the protruding part overlapping the GUI.

According to the present invention, for example, it is possible to display the GUI at a certain position of the screen. For example, since it is not necessary to secure a region for a two-dimensional object in the screen similar to Method B of the related art, the stereoscopic video may effectively use the entire screen.

Since the GUI is displayed at a position which is not superposed on the protruding part of the stereoscopic video as much as possible, the GUI does not block a protruding part having a highest importance degree in the stereoscopic video. Thus, it is possible to provide a vigorous stereoscopic video.

Accordingly, for example, it is possible to solve the problem of Method A of the related art.

Since parallax is applied such that the GUI appears to protrude from the screen along with the protruding parts overlapping the GUI, it is possible to prevent an uncomfortable experience for the user and to suppress eye strain.

Figure 13:
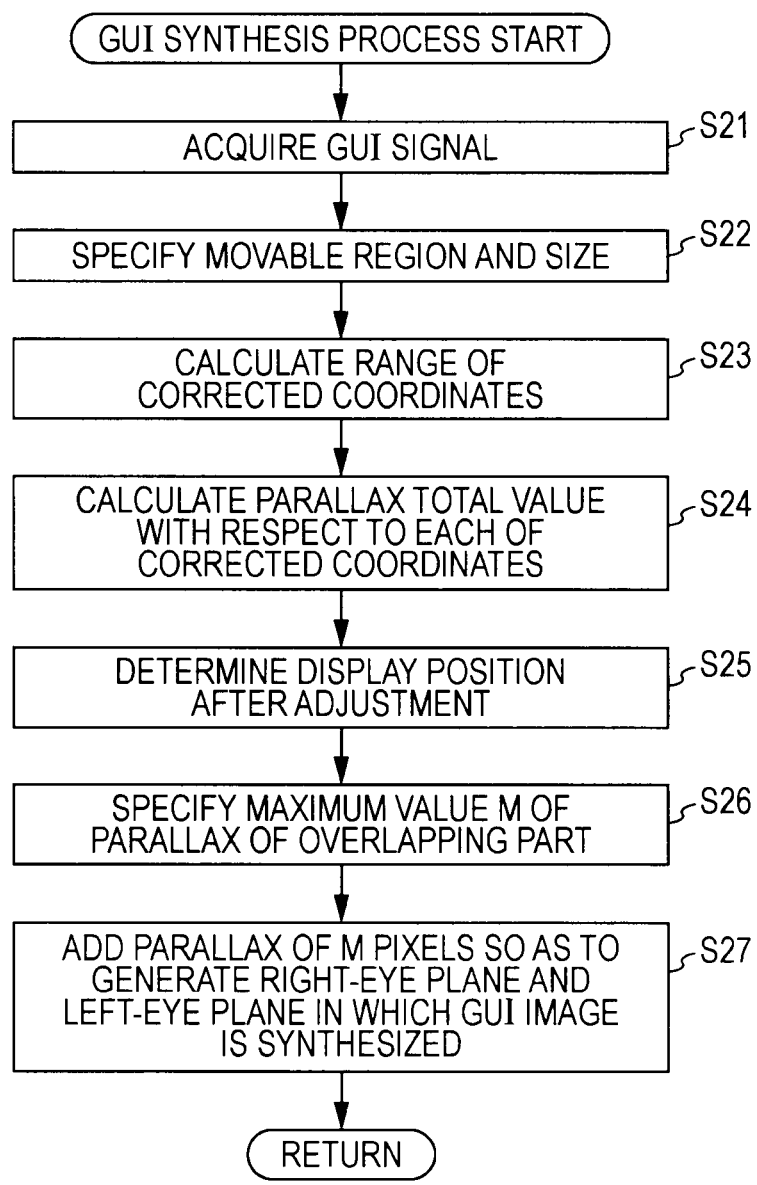
FIG. 13 is a flowchart illustrating a GUI synthesis process.

Next, an example of a GUI synthesis process by the object display adjustment unit 122 of FIG. 7 will be described with reference to the flowchart of FIG. 13.

In step S21, the display position adjustment unit 141 acquires a GUI signal.

In step S22, the display position adjustment unit 141 specifies the movable region and the size of the GUI based on the GUI signal acquired in step S21.

In step S23, the display position adjustment unit 141 calculates the range of the candidate coordinates based on the movable region and the size of the GUI specified in step S22. At this time, for example, the range of the candidate coordinates may be obtained by the calculation of the above-described equation (1).

In step S24, the display position adjustment unit 141 calculates a parallax total value with respect to all combinations of candidate coordinates (x, y) in the range obtained by the process of step S23. At this time, for example, as described with reference to FIG. 11, parallax total values corresponding to the candidate coordinates are calculated.

In step S25, the display position adjustment unit 141 determines a GUI display position after adjustment.

At this time, for example, a candidate coordinate having a smallest parallax total value is determined as a GUI display position after adjustment. In addition, if a plurality of candidate coordinates having a smallest parallax total value is present, a candidate coordinate closest to the standard display position is determined as the GUI display position after adjustment. If a plurality of candidate coordinates closest to the standard display position is present as a candidate coordinate having a smallest parallax total value, for example, one candidate coordinate randomly selected from among the candidate coordinates is determined as the GUI display position after adjustment.

In step S26, the parallax adjustment unit 142 obtains a maximum value M of a parallax value of a region overlapping the GUI if the GUI is displayed at the GUI display position after determined by the process of step S25. For example, in the case of the candidate coordinate shown in FIG. 11I, since the parallax total value is 1, when the GUI is displayed at the GUI display position after adjustment, the maximum value M of the parallax value of the region overlapping the GUI becomes 1.

In step S27, the parallax adjustment unit 142 applies parallax corresponding to M pixels based on the processed result of step S26 and generates a right-eye plane and a left-eye plane in which the GUI image of the GUI signal acquired by the process of step S21 is synthesized.

At this time, for example, in the frame for displaying the GUI, the image is synthesized such that the GUI is displayed at the GUI display position after adjustment of the right-eye plane. In the frame for displaying the GUI, the image is synthesized such that the GUI is displayed at a display position shifted from the GUI display position after adjustment of the left-eye plane to the right side of the screen by M pixels.

In this way, the GUI synthesis process is executed.

Although the case of synthesizing the GUI to the stereoscopic video has mainly been described in the above description, subtitles or other two-dimensional objects may be synthesized to the stereoscopic video.

Although the case where the parallax plane is included in the frame of the stereoscopic video signal has been described, the present invention is applicable to that the parallax plane is not included in the frame of the stereoscopic video signal. If the parallax plane is not included, for example, in the display position adjustment unit 141, by a block matching process or the like, the positions of the object of the right-eye plane and the left-eye plane are specified so as to obtain the same information as the parallax plane.

The above-described series of processes may be executed by hardware or software. If the above-described series of processes is to be executed by software, a program configuring the software is installed in a computer in which dedicated hardware is mounted from a network or a recording medium. Various programs capable of executing various functions are installed, for example, in a general-purpose personal computer 700 or the like shown in FIG. 14 from the network or the recording medium.

Figure 14:
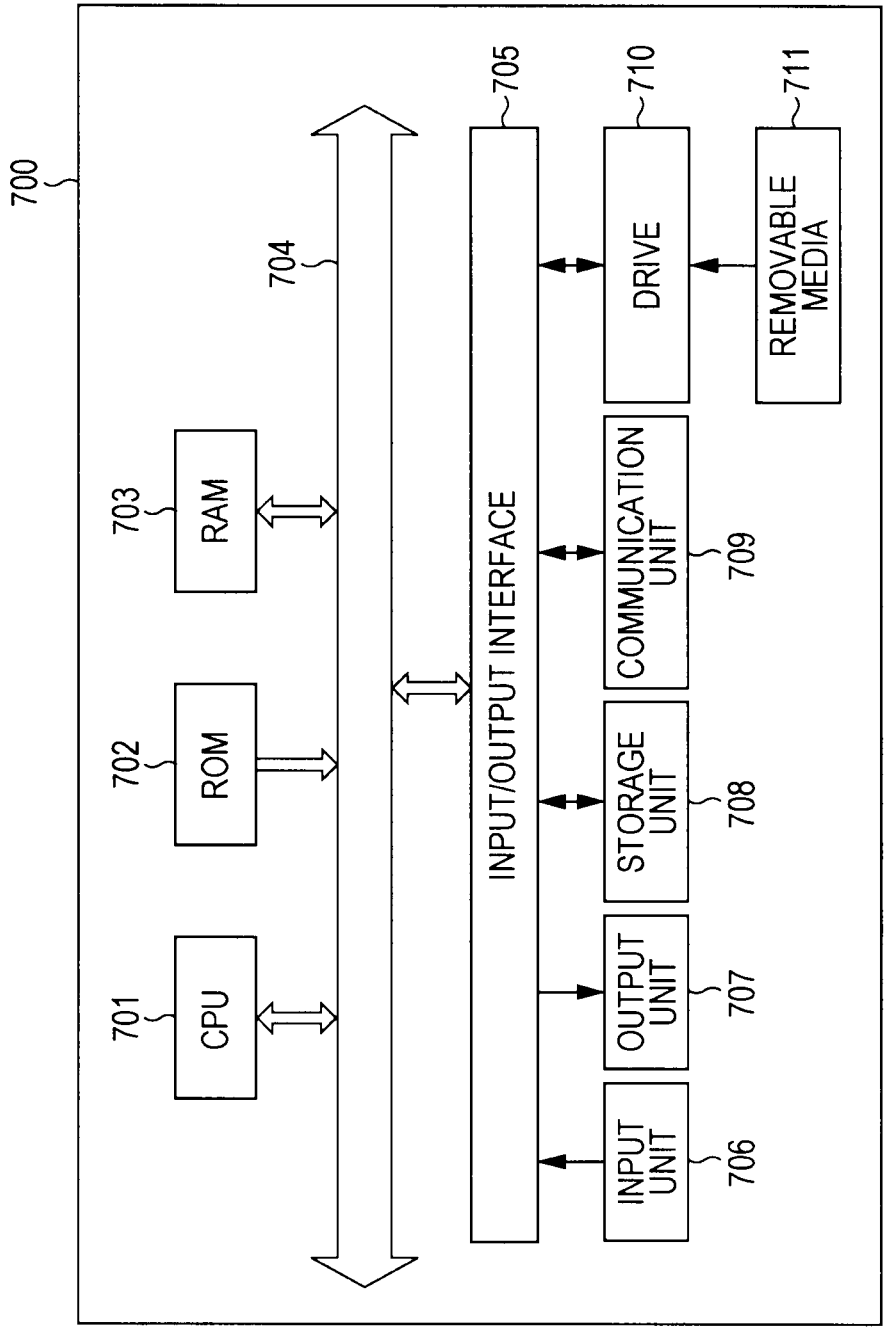
FIG. 14 is a block diagram showing a configuration example of a personal computer.

In FIG. 14, a Central Processing Unit (CPU) 701 executes various processes according to a program stored in a Read Only Memory (ROM) 702 or a program loaded from a storage unit 708 to a Random Access Memory (RAM) 703. In the RAM 703, data necessary for executing the various processes of the CPU 701 is appropriately stored.

The CPU 701, the ROM 702 and the RAM 703 are connected to each other through a bus 704. An input/output interface 705 is connected to the bus 704.

An input unit 706 including a keyboard, a mouse and the like, a display including a Liquid Crystal Display (LCD) and the like, and an output unit 707 including a speaker and the like are connected to the input/output interface 705. The storage unit 708 including a hard disk and the like and a communication unit 709 including a network interface card such as a modem and a LAN card are connected to the input/output interface 705. The communication unit 709 performs a communication process over a network including the Internet.

A drive 710 is connected to the input/output interface 705 if necessary and a removable media 711 such as a magnetic disk, an optical disc, a magnetooptical disc or a semiconductor memory is appropriately mounted. A computer program read from the removable media is installed in the storage unit 708 if necessary.

If the above-described series of processes is executed by software, the program configuring the software is installed from the network such as the Internet or the recording medium including the removable media 711 or the like.

The recording medium includes, for example, as shown in FIG. 14, not only the removable media 711 including a magnetic disk (including a floppy disk (registered trademark)), an optical disc (including a Compact Disc-Read Only Memory (CD-ROM) or a Digital Versatile Disc (DVD)), a magnetooptical disc (Mini disc (MD)), a semiconductor memory or the like, in which a program is recorded and which is distributed in order to deliver a program to a user, the ROM 702 in which a program is recorded and which is delivered to a user in a state of being assembled in the device body in advance, or the hard disk included in the storage unit 708.

The program executed by the computer may be a program for performing processes in time series in the order described in the present specification or, although not processed in time series, a program for performing processes in parallel or individually.

The embodiments of the present invention are not limited to the above-described embodiments and various modifications are made without departing from the scope of the present invention.

The present application contains subject matter related to that disclosed in Japanese Priority Patent Application JP 2010-036372 filed in the Japan Patent Office on Feb. 22, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic video processing device, comprising:
candidate coordinate range calculation circuitry configured to calculate a range of candidate coordinates of a display position of a reference point of a two-dimensional object in a screen based on a movable predetermined region for displaying the two-dimensional object on the screen of a stereoscopic video, and on a size of the two-dimensional object, the range of candidate coordinates including a plurality of display positions of the reference point;
parallax total value calculation circuitry configured to calculate a total value of parallax values of pixels of a region overlapping the two-dimensional object in the stereoscopic video, for each of the plurality of display positions of the reference point, if the two-dimensional object is displayed using each of the candidate coordinates in the range as a reference point;
display position determination circuitry configured to determine a candidate coordinate from among all of the plurality of display positions of the reference point having a smallest total value of the parallax values as a determined display position of the reference point of the two-dimensional object, the display position determination circuitry being further configured to select a candidate coordinate closest to a standard display position within the movable predetermined region and having the smallest total value of the parallax values as the determined display position, if more than one candidate coordinate has the smallest total value of the parallax values;
maximum value specifying circuitry configured to specify a maximum value of the parallax values of the pixels of the region overlapping the two-dimensional object in the stereoscopic video, if the two-dimensional object is displayed using the determined display position as the reference point; and
parallax setting circuitry configured to set parallax of the two-dimensional object displayed within the movable predetermined region in the stereoscopic video based on the specified maximum value, so that the set parallax of the two-dimensional object displayed within the movable predetermined region is equal to or less than the specified maximum value,
wherein the stereoscopic video has a frame rate per unit time, and the parallax total value calculation circuitry is further configured to calculate the total value of the parallax values specified based on a parallax plane representing parallax of each pixel of the pixels as information included in a frame of the stereoscopic video, and
wherein the display position determination circuitry is further configured to calculate the total value of the parallax values of the pixels of the region overlapping the two-dimensional object for each of the plurality of display positions of the reference point in a plurality of frames for displaying the two-dimensional object.

2. The stereoscopic video processing device according to claim 1, wherein the maximum value specifying circuitry is further configured to specify the maximum value of the parallax values of the pixels of the region overlapping the two-dimensional object in the stereoscopic video, if the two-dimensional object is displayed using the determined display position based on the parallax plane of the plurality of frames for displaying the two-dimensional object as the reference point.

3. A stereoscopic video processing method, comprising:
calculating, using circuitry, a range of candidate coordinates of a display position of a reference point of a two-dimensional object in a screen based on a movable predetermined region for displaying the two-dimensional object on the screen of a stereoscopic video, and on a size of the two-dimensional object, the range of candidate coordinates including a plurality of display positions of the reference point;
calculating, using the circuitry, a total value of parallax values of pixels of a region overlapping the two-dimensional object in the stereoscopic video, for each of the plurality of display positions of the reference point, if the two-dimensional object is displayed using each of the candidate coordinates in the range as a reference point;
determining, using the circuitry, a candidate coordinate from among all of the plurality of display positions of the reference point having a smallest total value of the parallax values as a determined display position of the reference point of the two-dimensional object, the determining including selecting a candidate coordinate closest to a standard display position within the movable predetermined region and having the smallest total value of the parallax values as the determined display position, if more than one candidate coordinate has the smallest total value of the parallax values;
specifying, using the circuitry, a maximum value of the parallax values of the pixels of the region overlapping the two-dimensional object in the stereoscopic video, if the two-dimensional object is displayed using the determined display position as a reference point; and
setting, using the circuitry, parallax of the two-dimensional object displayed within the movable predetermined region in the stereoscopic video based on the specified maximum value, so that the set parallax of the two-dimensional object displayed within the movable predetermined region is equal to or less than the specified maximum value,
wherein the stereoscopic video has a frame rate per unit time, and the calculating the total value of parallax values specified is based on a parallax plane representing parallax of each pixel of the pixels as information included in a frame of the stereoscopic video, and
wherein the determining the candidate coordinate further comprises calculating the total value of the parallax values of the pixels of the region overlapping the two-dimensional object for each of the plurality of display positions of the reference point in a plurality of frames for displaying the two-dimensional object.

4. A non-transitory computer readable storage medium encoded with a program that, when executed, causes a computer to perform a method, comprising:
calculating, using circuitry, a range of candidate coordinates of a display position of a reference point of a two-dimensional object in a screen based on a movable predetermined region for displaying the two-dimensional object on the screen of a stereoscopic video, and on a size of the two-dimensional object, the range of candidate coordinates including a plurality of display positions of the reference point;

calculating, using the circuitry, a total value of parallax values of pixels of a region overlapping the two-dimensional object in the stereoscopic video, for each of the plurality of display positions of the reference point, if the two-dimensional object is displayed using each of the candidate coordinates in the range as a reference point;

determining, using the circuitry, a candidate coordinate from among all of the plurality of display positions of the reference point having a smallest total value of the parallax values as a determined display position of the reference point of the two-dimensional object, and selecting a candidate coordinate closest to a standard display position within the movable predetermined region and having the smallest total value of the parallax values as the determined display position, if more than one candidate coordinate has the smallest total value of the parallax values;

specifying, using the circuitry, a maximum value of the parallax values of the pixels of the region overlapping the two-dimensional object in the stereoscopic video, if the two-dimensional object is displayed using the determined display position as the reference point; and setting, using the circuitry, parallax of the two-dimensional object displayed within the movable predetermined region in the stereoscopic video based on the specified maximum value, so that the set parallax of the two-dimensional object displayed within the movable predetermined region is equal to or less than the specified maximum value, wherein the stereoscopic video has a frame rate per unit time, and the calculating the total value of parallax values specified is based on a parallax plane representing parallax of each pixel of the pixels as information included in a frame of the stereoscopic video, and wherein the determining the candidate coordinate further comprises calculating the total value of the parallax values of the pixels of the region overlapping the two-dimensional object for each of the plurality of display positions of the reference point in a plurality of frames for displaying the two-dimensional object.

5. A stereoscopic video processing device, comprising:
circuitry configured to:
calculate a range of candidate coordinates of a display position of a reference point of a two-dimensional object in a screen based on a movable predetermined region for displaying the two-dimensional object on the screen of a stereoscopic video, and on a size of the two-dimensional object, the range of candidate coordinates including a plurality of display positions of the reference point;

calculate a total value of parallax values of pixels of a region overlapping the two-dimensional object in the stereoscopic video, for each of the plurality of display positions of the reference point, if the two-dimensional object is displayed using each of the candidate coordinates in the range as a reference point;

determine a candidate coordinate from among all of the plurality of display positions of the reference point having a smallest total value of the parallax values as a determined display position of the reference point of the two-dimensional object, and to select a candidate coordinate closest to a standard display position within the movable predetermined region and having the smallest total value of the parallax values as the determined display position, if more than one candidate coordinate has the smallest total value of the parallax values;

specify a maximum value of the parallax values of the pixels of the region overlapping the two-dimensional object in the stereoscopic video, if the two-dimensional object is displayed using the determined display position as the reference point; and set parallax of the two-dimensional object displayed within the movable predetermined region in the stereoscopic video based on the specified maximum value, so that the set parallax of the two-dimensional object displayed within the movable predetermined region is equal to or less than the specified maximum value, wherein the stereoscopic video has a frame rate per unit time, and the circuitry is further configured to calculate the total value of the parallax values specified based on a parallax plane representing parallax of each pixel of the pixels as information included in a frame of the stereoscopic video, and wherein the circuitry is further configured to calculate the total value of the parallax values of the pixels of the region overlapping the two-dimensional object for each of the plurality of display positions of the reference point in a plurality of frames for displaying the two-dimensional object.

6. The stereoscopic video processing device according to claim 5, wherein the circuitry is further configured to calculate the total value of parallax values for each of 10 display positions of the reference point.

7. The stereoscopic video processing device according to claim 5, wherein the circuitry is further configured to calculate the total value of parallax values for each of 10 display positions of the reference point, the 10 display positions being included in 5 different frames.

8. The stereoscopic video processing device according to claim 5, wherein the circuitry is further configured to randomly select a candidate coordinate from among candidate coordinates closest to the standard display position and having the smallest total value of the parallax values if more than one candidate coordinate is closest to the standard display position and has the smallest total value of the parallax values.

* * * * *